Sept. 15, 1925.  1,553,737
J. ALLINGHAM
PROCESS OF CONCENTRATING GASES FROM GASEOUS MIXTURES
Filed July 31, 1923
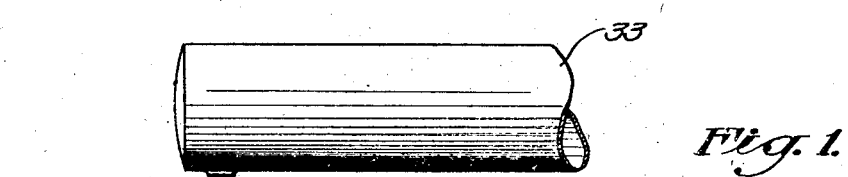
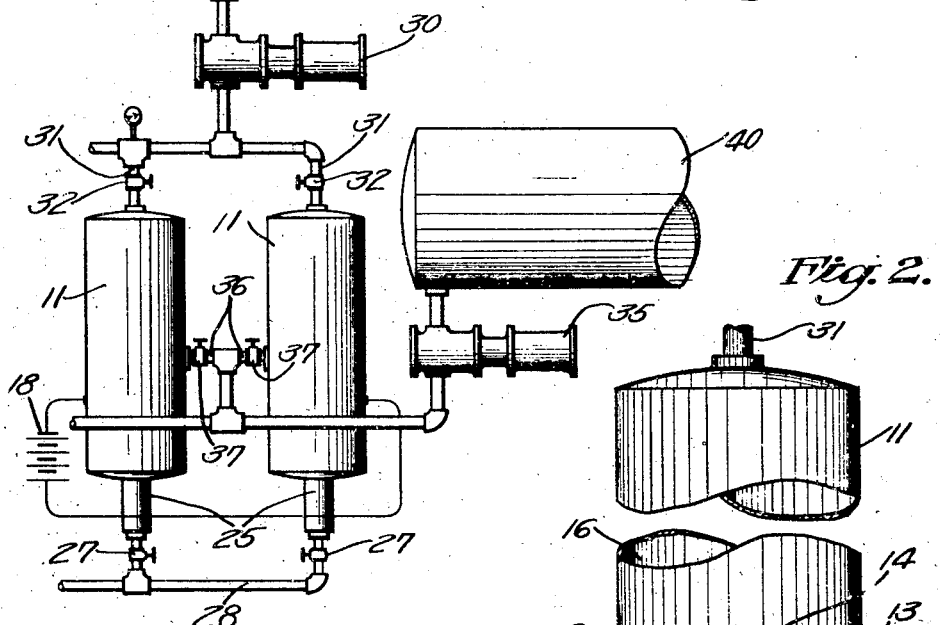
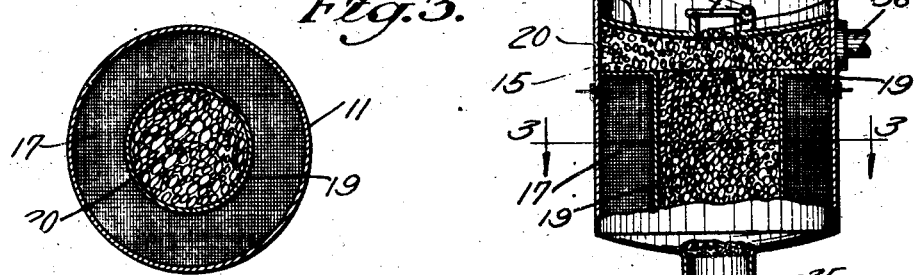
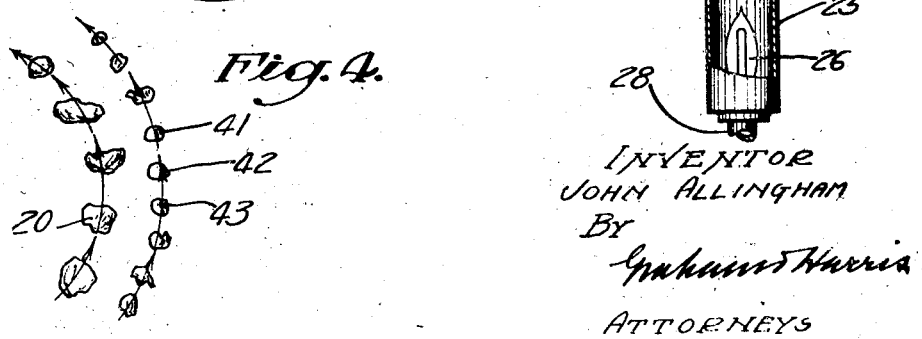
INVENTOR
JOHN ALLINGHAM
BY
Graham S Harris
ATTORNEYS Patented Sept. 15, 1925.

1,553,737

UNITED STATES PATENT OFFICE.

JOHN ALLINGHAM, OF LOS ANGELES, CALIFORNIA.

PROCESS OF CONCENTRATING GASES FROM GASEOUS MIXTURES.

Application filed July 31, 1923. Serial No. 654,904.

*To all whom it may concern:*

Be it known that I, JOHN ALLINGHAM, a subject of the King of England, residing at Los Angeles, in the county of Los Angeles and State of California, have invented a new and useful Process of Concentrating Gases from Gaseous Mixtures, of which the following is a specification.

My invention is applicable to the separation or concentration from gaseous mixtures of one or more gases. It is necessary for the operation of the process that the mixture of gases shall contain one or more gases which have a higher magnetic permeability than the remainder of the mixture. These high permeability gases are acted upon by a magnetic flux so that a concentration of these gases occurs in certain parts of the apparatus, this concentration being later followed by the separation of the concentrated portion of the mixture from the remainder of the mixture.

My invention is particularly applicable to the concentration of oxygen from air, and although the process may be applied to other types of mixture for the purpose of separating other gases or mixtures of gases, I shall for the purpose of illustration confine the following specification to one embodiment of the invention, namely, the concentration of oxygen from air.

It is a well known fact that the air is a gaseous mixture containing oxygen, nitrogen and other gases. Air is used in combustion with many substances in various arts. In such combustion and in many chemical uses to which air is applied, only the oxygen is utilized, the nitrogen being generally merely an inert diluting agent which tends to retard the combustion or other reaction, and to reduce the speed and economy of the process. This is true not only in processes in which the air is used directly as an agent for combustion, but is true in many other commercial processes in which oxygen is necessary, and in which it is supplied by the addition of air.

There are at present in use several processes by which oxygen may be isolated in various degrees of purity, and the commercial oxygen so produced finds a large commercial use in many ways. Oxygen is produced, for example, by the so-called liquefaction process, and also by electrolysis. Oxygen produced by any of the present well known processes is, however, too expensive to be used for many purposes to which cheap oxygen could be applied.

It is an object of my invention to provide a method of commercially separating the oxygen from the nitrogen of the air, either for the purpose of producing commercial oxygen as now understood, or for producing a mixture richer in oxygen than ordinary air. The degree of enrichment can be controlled by my process within considerable limits, the amount of oxygen in the mixture being simply a function of expense, so that where a slight concentration of oxygen is sufficient it can be produced cheaply, greater concentration being obtained at greater expense.

A further object of my invention is to provide a process of concentrating oxygen from a gaseous mixture which will employ simple apparatus and which will be extremely cheap to operate.

Further objects and advantages will be made evident hereinafter.

It is a well known fact that the magnetic permeability of elements varies widely. Inasmuch as the permeability of iron is many times that of most other elements, we are accustomed to think of iron as a magnetic material and of other substances as non-magnetic. It is, however, well known that there are many other substances which show a measurable magnetic permeability. The magnetic permeability of oxygen is considerably greater than the magnetic permeability of nitrogen, so that oxygen tends to move into a strong magnetic field and to displace the nitrogen therefrom.

While my invention may be carried on by various sorts of apparatus, that shown in the drawings is well suited for this purpose.

In these drawings, Fig. 1 is a side elevation of an apparatus adapted to carry on my invention.

Fig. 2 is a side elevation partly in section of an apparatus by which concentration may be effected.

Fig. 3 is a section on a plane represented by the line 3—3 of Fig. 2.

Fig. 4 is a diagram on a greatly enlarged scale showing how magnetic lines of force may act.

In the form of apparatus shown, which is largely diagrammatic and shown for illustrative purposes only, I provide concentrators 11, each of which is formed of a tight shell having a partition 12 therein. The partition 12 has a central opening 13 normally closed by a check valve 14, this valve allowing gases to pass from an oxygen chamber 15 inside the shell 11 below the partition 12 into a nitrogen chamber 16 inside the shell 11 above the partition 12, but preventing any gases from passing downwardly through the opening 13 from the chamber 16 into the chamber 15. Situated in the chamber 15 and preferably wound on a fiber spool 19 is a magnetizing coil 17 which is fed by electric current from a battery 18 or from any other convenient source of power. Filling the bore of the spool 16 and extending over the ends of that spool is a body of material 20, which, for convenience, we will designate as paramagnetic material, that is to say, material which has a higher magnetic permeability than air. This paramagnetic material is closely spaced so that the spaces therebetween into which air may be drawn are very small. The presence of this material has the effect of reinforcing the magnetic field, in view of the fact that the condensation of the lines of force is much greater with the paramagnetic material present than if this material were removed. This condition of the magnetic field, which I prefer to designate for the purpose of patentable distinction as reinforced, is as just mentioned, the direct result of the presence of what is conveniently designated as paramagnetic material. It may be iron filings or it may be some other paramagnetic material. Air is admitted to the chamber 15 through an ionizing chamber 25 in which is placed an ionizing source 26. The supply of air to the chamber 25 is controlled by valves 27. The material supplied to the pipe 28 may be air in its natural state or it may consist of any gaseous mixture containing oxygen. In practice the pipe 28 may be supplied with a mixture of oxygen and other gases in which the oxygen content has already been increased by the use of my process or by any other convenient means. A vacuum pump 30 is provided which draws gas through pipes 31 and valves 32 from the nitrogen chamber 16, delivering this gas under atmospheric or a higher pressure to a depleted mixture tank 33. An oxygen vacuum pump 35 is also provided which draws gases through pipes 36 and valves 37 from the chamber 15, this oxygen mixture or enriched mixture being delivered to an enriched mixture tank 40 under atmospheric or a higher pressure.

The method of operation of my invention is as follows:

The valves 27 and 37 being closed, the chambers 15 and 16 are partially exhausted of air or other gas by the pump 30. The valve 32 is then closed and the valve 27 opened slightly and air or a previously enriched mixture of air and oxygen is allowed to flow from the pipe 28 into the chamber 25 where the air or mixture expands.

In the chamber 25 it is subjected to the action of the ionizing source 26. This may be a source of ultra-violet rays, or may consist of means for producing a high voltage silent brush electric discharge, or any method of producing ionizing action. It is possible that this ionizing source produces ozone which may be in itself of higher magnetic permeability than nitrogen.

Owing to the intense magnetic field set up by the coil 17, lines of force pass through the paramagnetic material as shown in Fig. 4, in which 41, 42 and 43 are successive particles of paramagnetic material in one of these lines of force. It is necessary for these lines of force to jump across small gaps between successive particles of the paramagnetic material, as for example, from the particle 41 to the particle 42, or from the particle 42 to the particle 43. The highly concentrated magnetic fields between the particles act upon the oxygen which, therefore, moves into the space between the particles, displacing the nitrogen which has a lower magnetic permeability. The magnetic field, therefore, tends to hold a considerable portion of the oxygen molecules, the nitrogen molecules passing freely on through the check valve 14 into the space 16. The result is that the gaseous mixture in the space 16 contains a larger portion of nitrogen than the ordinary gaseous mixture delivered to the pipe 28, or, what is the same thing, is deficient in oxygen. Due to the admission of gas into the concentrator, the pressure rises therein; when the vacuum has been reduced to any desired degree, the valve 32 is opened and the depleted mixture is forced into the tank 33 at any desired pressure by the pump 30. This depleted mixture, being lower in oxygen and higher in nitrogen than the original mixture, is in some cases itself a valuable commercial product, and in some cases my process may be operated primarily for the purpose of producing a high nitrogen mixture, the enriched mixture containing an excess of oxygen, being in this case a by-product. Ordinarily, however, the enriched mixture is the principal commercial product sought. After the process has been in operation for some time, the concentration of oxygen in the chamber 15 rises to the desired degree, and the valve 27 is closed and the valve 37 is opened. The enriched mixture may then be drawn off from the chamber 16 by means of the pump 35 and compressed into the enriched mixture tank 40. As soon as the desired degree of exhaustion has been reached in the chamber 15, the valves 37 may be closed and the valves 27 slightly opened to allow fresh material to pass into the chamber 15 and to slowly expand therein, and the above described cycle to be repeated.

Obviously, economical operation of a plant for carrying on my process involves the use of a number of concentrators 11, which are used alternately and which may be connected in series with each other for the purpose of increasing the concentration.

I do not wish to be understood as confining myself to the type of apparatus mechanically detailed herein.

It will be seen that my invention involves the conception of utilizing a magnetic field to concentrate and trap the oxygen molecules out of a gaseous mixture. It further involves the conception of utilizing the finely divided mass of paramagnetic material for the purpose of concentrating the magnetic field at certain points and providing a multiplicity of small magnetic fields in each of which the oxygen is retained. It further involves the conception of passing the gaseous mixture into the concentrating chamber in an ionized condition.

I am unable to explain entirely the theories upon which my apparatus operates, but I have demonstrated that it is operative.

I claim as my invention:

1. A process of concentrating gaseous products in a mixture containing materials of lower magnetic permeability, comprising: ionizing said mixture; subjecting the ionized mixture to the action of a magnetic field wherein said product is magnetically concentrated owing to its higher magnetic permeability; and thereafter isolating said concentrated portion of said mixture from the remainder of said mixture.

2. A process of concentrating gaseous products in a mixture containing materials of lower magnetic permeability, comprising: ionizing said mixture; passing said ionized mixture into a reinforced magnetic field wherein said product is magnetically concentrated owing to its higher magnetic permeability; and thereafter isolating said concentrated portion of said mixture from the remainder of said mixture.

3. A process of concentrating gaseous products in a mixture containing materials of lower magnetic permeability, comprising: ionizing said mixture; subjecting said ionized mixture to the action of a magnetic flux in a reinforced magnetic field wherein said product is magnetically concentrated owing to its higher magnetic permeability; and thereafter isolating said concentrated portion of said mixture from the remainder of said mixture.

4. A process of concentrating gaseous products in a mixture containing materials of lower magnetic permeability, comprising: ionizing said mixture; expanding said ionized mixture into a reinforced magnetic field wherein said product is magnetically concentrated owing to its higher magnetic permeability; and thereafter isolating said concentrated portion of said mixture from the remainder of said mixture.

In testimony whereof, I have hereunto set my hand at Los Angeles, California, this 26th day of July 1923.

JOHN. ALLINGHAM.